(No Model.) 2 Sheets—Sheet 1.

I. F. THOMPSON.
CLUTCH MECHANISM.

No. 505,257. Patented Sept. 19, 1893.

Witnesses,
J. H. Rouse
J. A. Bayless

Inventor,
Isaac F. Thompson
By Dewey & Co.
Att'ys (No Model.) 2 Sheets—Sheet 2.

I. F. THOMPSON.
CLUTCH MECHANISM.

No. 505,257. Patented Sept. 19, 1893.

Witnesses,
J H Kruse
J. A Bayless

Inventor,
Isaac F. Thompson
By Dewey & Co.
attys

UNITED STATES PATENT OFFICE.

ISAAC F. THOMPSON, OF SAN FRANCISCO, CALIFORNIA, ASSIGNOR OF ONE-HALF TO WALES L. PALMER, OF SAME PLACE.

CLUTCH MECHANISM.

SPECIFICATION forming part of Letters Patent No. 505,257, dated September 19, 1893.

Application filed December 20, 1892. Serial No. 455,802. (No model.)

*To all whom it may concern:*

Be it known that I, ISAAC F. THOMPSON, a citizen of the United States, residing in the city and county of San Francisco, State of California, have invented an Improvement in Clutch Mechanisms; and I hereby declare the following to be a full, clear, and exact description of the same.

My invention relates to a clutch mechanism which is adapted for use upon pulleys, or for coupling purposes, and it consists in certain details of construction which will be more fully explained by reference to the accompanying drawings, in which—

Figure 1:
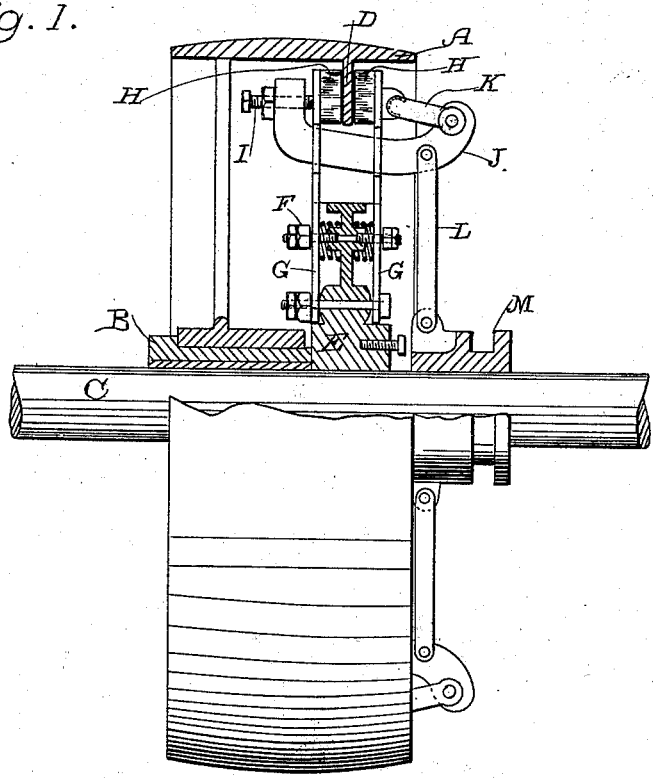
Figure 2:
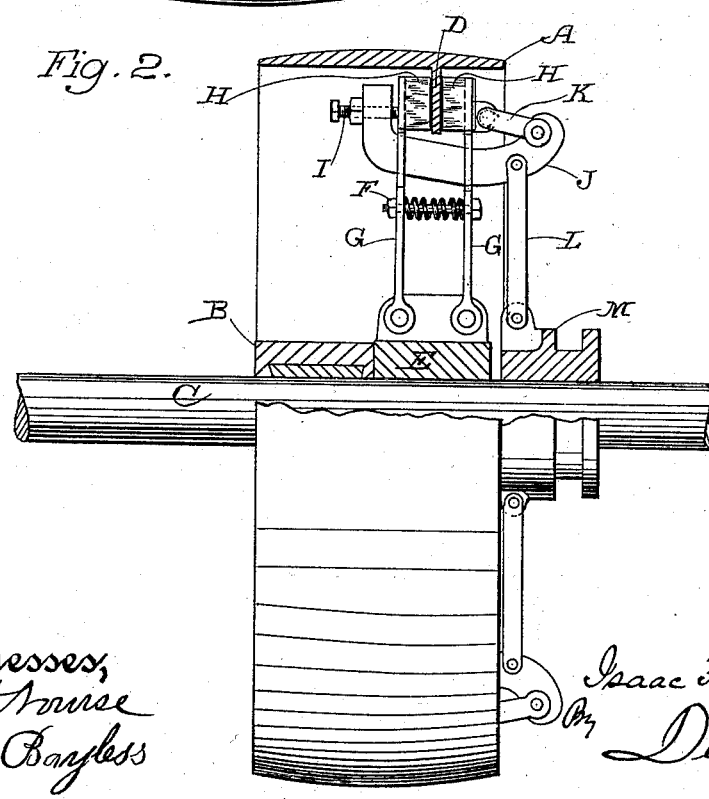
Figure 3:
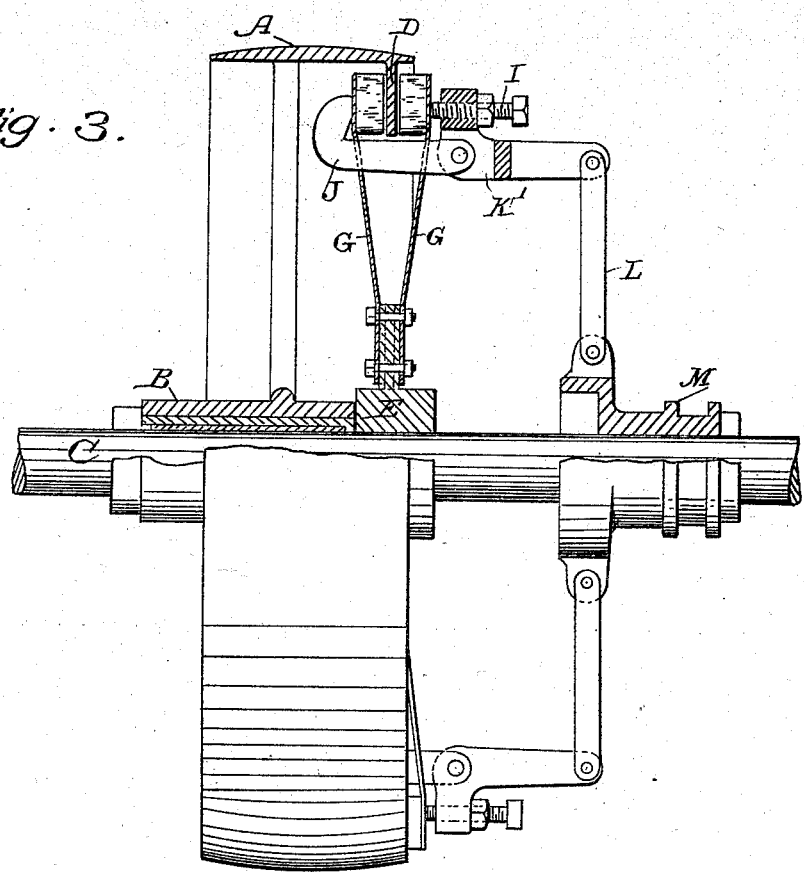

Figure 1 is a side elevation of a pulley, partially in section, showing my device. Fig. 2 is a similar view showing a modification of the arms supporting the clamping blocks. Fig. 3 is another modification of the same device.

In the present case I have shown my device applied to a pulley, for the purpose of connecting it with, or disconnecting it from its driving shaft.

A is the pulley, having the hub B, and C is the shaft. In the present case I have shown the pulley turning loosely upon the shaft which is the driver, and when the pulley is connected with the shaft, it will be driven thereby, and when released from it, it will remain stationary.

D is an annular lip or flange projecting radially inwardly from the inner periphery of the pulley rim.

E is a hub keyed to the shaft rotating therewith. To this hub the arms G are secured, projecting outwardly therefrom. These arms carry upon their outer ends the frictional clamping blocks H which are thus supported upon each side of the flange D. The arms which support the clamping blocks may be also supported and adjusted in various ways.

In Fig. 3, I have shown the arms G made of steel or other elastic metal, and they normally hold the blocks H a little out of contact with the flange D, so that rotation of the pulley or shaft may take place without friction with the clamping blocks.

In Fig. 1, I have shown the arms held apart by a spiral spring, and the distance of the clamping blocks from the flange is regulated by nuts and bolts F.

In Fig. 2 the arms are hinged to the hub instead of being made elastic. In this case also they are forced apart by a spring, and the distance of the clamping blocks from the flange D is regulated the same as in Fig. 1, by spring adjusting nuts and bolts F. The arms which carry the clamping blocks H have slots made in them just interior to the blocks, and through these pass the clamping yokes J. One end of each yoke engages the inner clamping block and the other end is connected with and operates the opposing clamping block, and each yoke and its connected parts are supported in the slots through which the yoke passes, without any fixed working center or fulcrum.

In Figs. 1 and 2, I have shown the yokes J curved so that their opposite ends are approximately opposite to the centers of the clamping blocks upon which they act. Through the inner end of each yoke passes a screw I, which bears against the rear of the clamping block, and by which adjustment is made as required. The outer end of the yoke is connected with the center of the opposing clamping block by means of a link K, as shown. The grooved collar M is adapted to slide upon a feather on the shaft, and is moved by a forked lever engaging the groove in the usual manner. This collar is connected with the yokes J by links L, so that when the collar is moved toward the pulley, it acts through the links L to force the outer ends of the arms or yokes J outward. This movement acts through the links K to force the clamping blocks H into contact with the flange, and compress them against it with as much force as desired. It will be seen that both the arms or links K and L act as toggle levers, the movable ends being gradually moved toward the line of their fulcrumed ends, and I thus have a powerful double toggle.

In Fig. 3 I have shown a modification in which the link K' is in the form of a bell crank lever, to the angle of which the outer end of the yoke J is connected. The short arm of this lever acts against the outer clamping block, in the same manner as the link K, and its long arm is connected with the collar M by the link L. In this form of construction the adjusting screw is adapted to act upon the outer clamping shoe, but the action is the same in either case by reason of there being no fixed fulcrums for the yokes and levers. It will be seen that by this construction the clamping yokes J have no fixed centers, but are simply supported upon the bottom wall of the slots in the arms G through which they pass, and the ends of the yokes act, through their connections, against the centers of the clamping shoes, any adjustment for wear, or to set the shoes a proper distance from the flange D, being readily made by the screws I.

Having thus described my invention, what I claim as new, and desire to secure by Letters Patent, is—

1. A frictional clutch consisting of a hub secured to the drive shaft, the pulley or rim having the inwardly projecting annular flange, clamping shoes supported upon independent arms, which extend radially outward from said hub to which they are secured and have the outer ends movable to and from each other, yokes passing through slots in the arms so that the inner ends of the yokes press against the center of the inner clamping shoes, links to which the outer ends of the yokes are pivoted, each of said links having one end adapted to press against the center of one of the outer clamping shoes, a collar sliding upon the shaft of the pulley, and means whereby the clamping shoes are actuated by the shifting of the collar, substantially as herein described.

2. A frictional clutch consisting of a pulley having an inwardly projecting annular flange, clamping shoes adapted to press upon opposite sides of said flange, radial arms, upon the outer ends of which said shoes are supported, and means by which they are thrown out of contact with the flange when released from pressure, yokes extending through and loosely supported in slots in the arms which carry the shoes, having the inner ends adapted to force the inner clamping shoes against the flange, links to which the outer ends of the yokes are pivoted, adjusting devices passing through the arms of the yokes, and acting against the clamping shoes, a collar sliding upon the shaft, links connecting the collar with the yokes, whereby the movement of the collar in one direction causes the clamping shoes to grip the flange between them, and a movement in the opposite direction withdraws the shoes and releases the flange, substantially as herein described.

In witness whereof I have hereunto set my hand.

ISAAC F. THOMPSON.

Witnesses:
S. H. NOURSE,
J. A. BAYLESS.